United States Patent

[11] 3,576,226

| [72] | Inventor | Kermit L. Copeland |
| | | Bellevue, Ill. |
| [21] | Appl. No. | 805,459 |
| [22] | Filed | Mar. 10, 1969 |
| [45] | Patented | Apr. 27, 1971 |
| [73] | Assignee | Caterpillar Tractor Co. |
| | | Peoria, Ill. |

[54] COMPENSATING LINKAGE FOR CRAWLER TRACTORS
6 Claims, 4 Drawing Figs.

| [52] | U.S. Cl. | 180/9.5 |
| [51] | Int. Cl. | B62d 55/10 |
| [50] | Field of Search | 180/9.5, |
| | | 9.54, 9.56, 9.58, 9.6 |

[56] References Cited
UNITED STATES PATENTS

| 1,890,975 | 12/1932 | Erdahl | 180/9.6 |
| 2,064,747 | 12/1936 | Heaslet | 180/9.54 |
| 2,705,175 | 3/1955 | McIntyre | 180/9.54 |
| 2,978,050 | 4/1961 | Risk | 180/9.5 |
| 2,863,516 | 12/1958 | Peterson | 180/9.5 |

*Primary Examiner*—Richard J. Johnson
*Attorney*—Fryer, Tjensvold, Feix, Philips & Lempio ABSTRACT: Compensating linkage in a crawler tractor having a main frame with track roller frames pivoted at one end thereof comprising a lever pivoted to the free end of each roller frame and two links pivotally interconnecting each lever with the main frame, the linkage to provide for relatively constant lateral and longitudinal alignment of the roller frames during oscillation of the roller frames relative to the main frame.

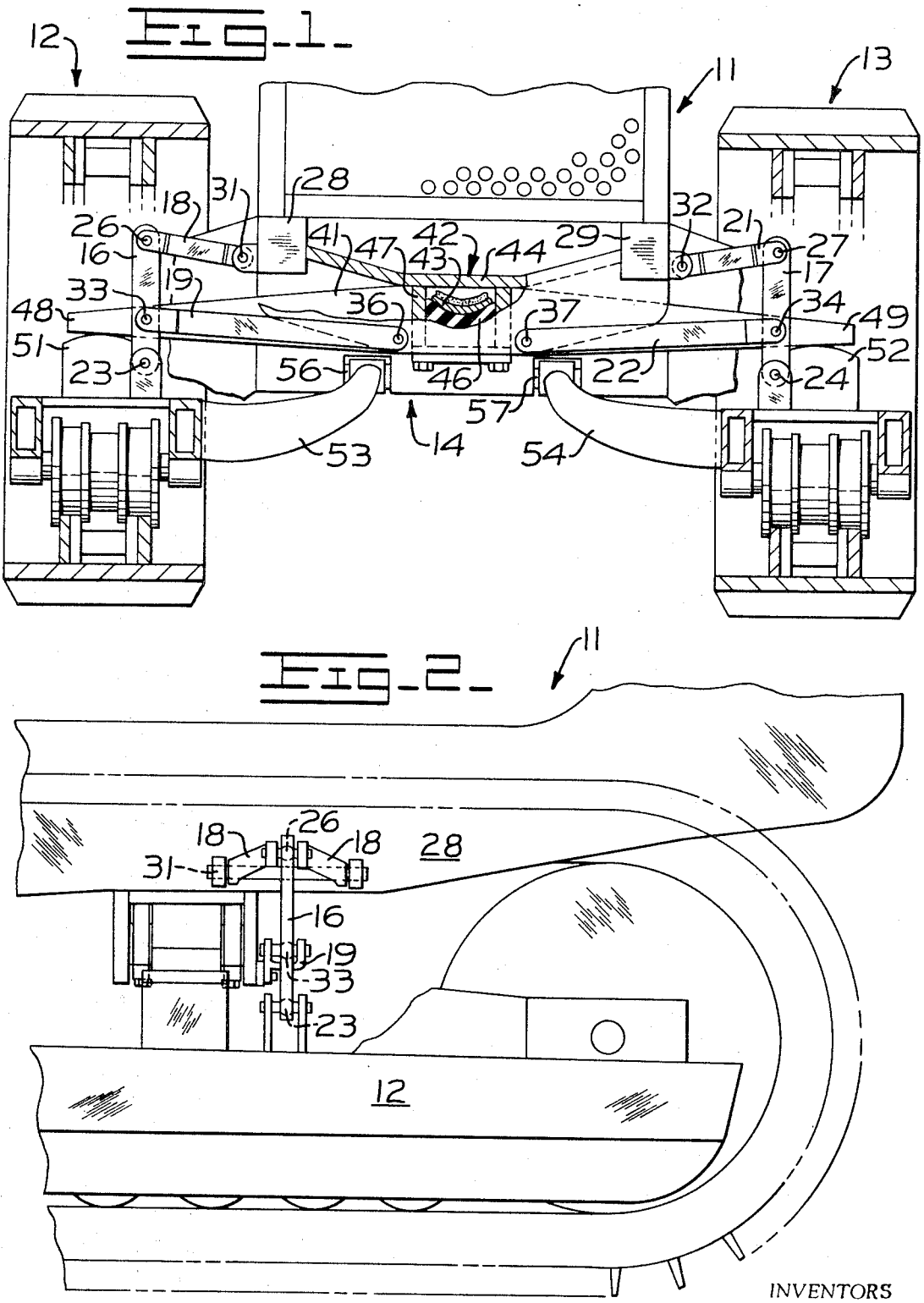

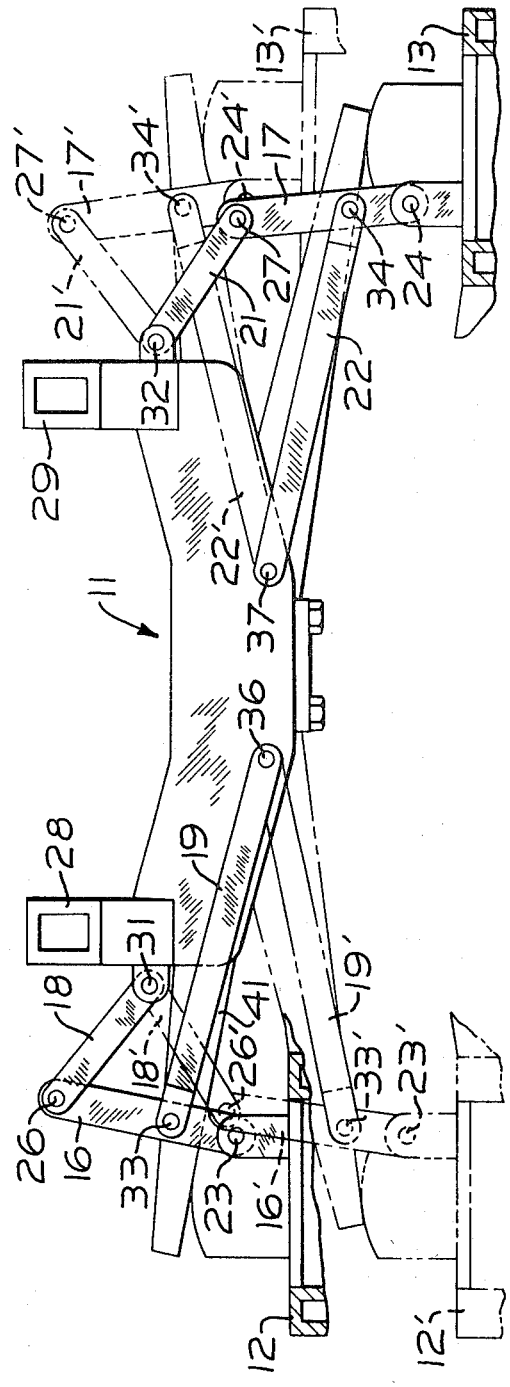

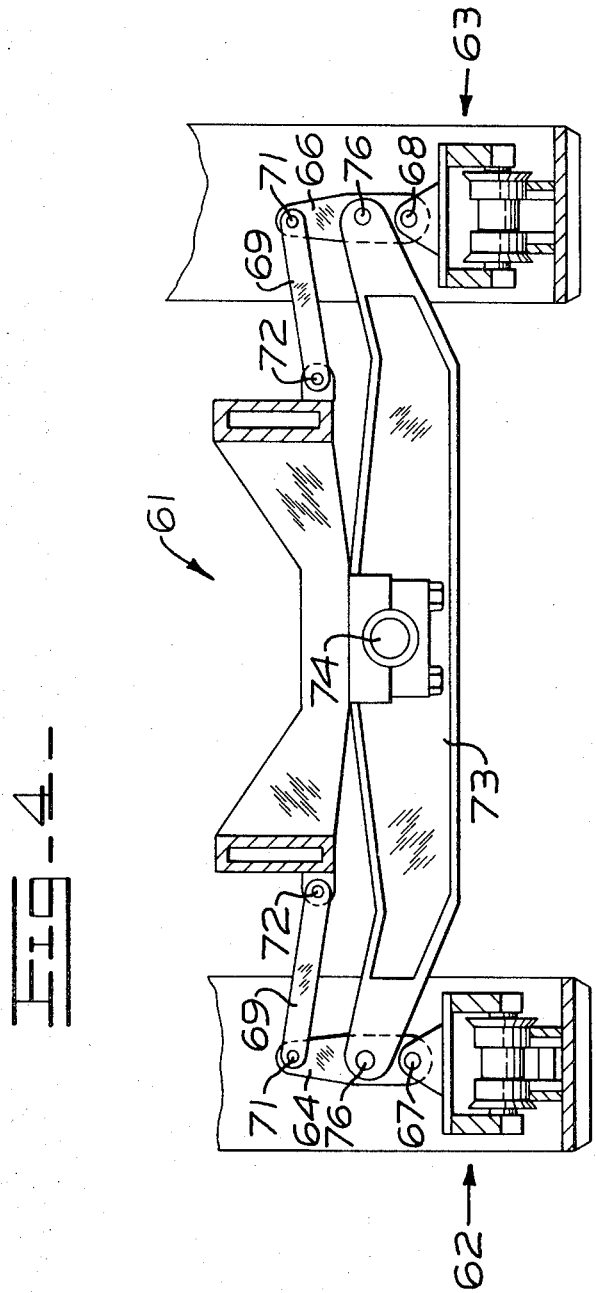
INVENTORS
KERMIT L. COPELAND

COMPENSATING LINKAGE FOR CRAWLER TRACTORS

Conventional crawler or track-type tractors comprise a main frame supporting a power unit and transmission mechanism with track roller frames being disposed on opposite sides of the main frame and carrying endless tracks. The roller frames are commonly connected adjacent their rearward end to the main frame through sprocket shafts which carry sprockets for driving the endless track. This connection is generally nonresilient but permits the roller frame to pivot about the axis of the sprocket shaft so that their forward ends can oscillate upwardly or downwardly as the tractor travels over obstacles or uneven terrain. Within such an arrangement, large side loads may arise in forward portions of the roller frames, for example, during sidehill operations or when the roller frames encounter rocks or other obstacles during a turning maneuver. The length of the roller frames provide large moment arms through which these side loads may act to cause undesirable misalignment of the roller frames at their rearward connections with the main frame. Such misalignment commonly results in premature failure of the rear supporting bearings between the sprocket shafts and the roller frames.

One prior-art approach to overcome this problem has been the use of diagonal braces which connect the roller frames and the main frame adjacent the sprocket shaft. These braces have been found to be unsatisfactory for sufficiently limiting the amount of misalignment between the roller frames and the main frame.

It is accordingly an object of the present invention to provide a compensating linkage between the main frame and the roller frames which overcomes the above problem by maintaining generally constant lateral alignment of the roller frames relative to the main frame during oscillation of the roller frames about their pivotal or drive connections with the main frame. Compensating linkage of the type contemplated by the present invention may also be adapted to the roller frames and chassis of existing tractors to similarly overcome the problems of misalignment as discussed above.

Other objects and advantages of the invention are made apparent in the following description having reference to the accompanying drawings.

In the drawings:

FIG. 1 is a fragmentary end view, with parts in section, of the main frame and roller frames of a crawler tractor and including the compensating linkage of the present invention;

FIG. 2 is a partial side view taken from the left side of FIG. 1;

FIG. 3 is a fragmentary end view similar to FIG. 1 illustrating operation of the compensating linkage during oscillation of the roller frames relative to the main frame; and FIG. 4 is a view generally similar to FIG. 1 and illustrates another embodiment of the present compensating linkage.

A crawler or track-type tractor of the type contemplated by the present invention is illustrated in FIG. 1 and includes a main frame or chassis 11 having track roller frames 12 and 13 disposed on its opposite sides. The roller frames are pivoted at their rearward end to the main frame by drive means (not shown) which are enclosed within a housing indicated at 14. In this type of tractor, the forward or free ends of the roller frames are commonly unrestrained from lateral motion relative to the main frame so that substantial misalignment may result in the drive connections enclosed within the housing 14.

To overcome such misalignment, the present invention provides a compensating linkage comprising levers 16 and 17 which are associated with the respective roller frames 12 and 13 and a pair of links 18, 19 and 21, 22 which pivotally interconnect the respective levers with the main frame. The lengths of the levers and links and their arrangement between the main frame and roller frames 12 and 13 is selected to maintain generally constant longitudinal and lateral alignment of the roller frames relative to the main frame. Numerous arrangements of this compensating linkage are possible within the scope of the present invention. In a particular embodiment of the invention as illustrated in FIGS. 1 and 2, the levers 16 and 17 are connected at one end to the respective roller frames 12 and 13 by pivotal connections indicated at 23 and 24. The levers 16 and 17 extend generally upwardly from their pivotal connections 23 and 24 with their opposite ends being pivoted to the links 18 and 21 as indicated at 26 and 27 respectively. The upper links 18 and 21 are relatively short and are pivoted to side portions 28 and 29 of the main frame 11 as indicated at 31 and 32 respectively. As is apparent from FIG. 2, the links 18 and 21 are formed to prevent longitudinal motion of the pivot point 26 relative to the main frame 11. The links 19 and 22 are relatively long and are pivoted to intermediate portions of the levers 16 and 17 respectively as indicated at 33 and 34. The links 19 and 22 are also pivoted at 36 and 37 respectively to the main frame 11 generally adjacent its longitudinal centerline. As best seen in FIG. 2, the pivotal connections which join the levers 16 and 17 to the respective roller frames and compensating links are spherical support bearings to accommodate universal oscillation of the levers 16 and 17.

The lengths and arrangements of the levers 16, 17 and the links 18, 19 and 21, 22 are selected to hold the roller frames equidistant from each other and from the centerline of the main frame during oscillation of the roller frames relative to the main frame. In addition, this compensating linkage serves to distribute side loads imposed on one roller frame, for example, when the tractor is turning or operating on a transverse grade or when one of the roller frames encounters an obstruction. When such side loads are experienced by one of the roller frames, the present compensating linkage tends to distribute and transfer portions of that load to the main frame and the opposite roller frame, thereby eliminating or decreasing substantially lateral misalignment of the roller frames.

Operation of the present compensating linkage may be better understood having reference to FIG. 3. Referring momentarily to FIG. 1, the roller frames are shown in a normal operating position generally parallel to a longitudinal axis of the main frame such as would occur during operation of the tractor on a level surface. As indicated in that FIG., the length and arrangement of the two links associated with each of the levers 16 and 17 cause the levers to assume a generally vertical position. Referring now to FIG. 3 and particularly to the roller frame and compensating linkage on the left-hand side of the main frame as viewed in the FIG., the roller frame and linkage is shown in solid lines with the forward end of the roller frame being oscillated upwardly relative to the main frame. The roller frame and linkage are shown in broken lines at a position where the forward end of the roller frame is oscillated downwardly relative to the main frame. As the roller frame is oscillated in either direction, the upper end of the lever 16 as represented by the pivot point 26 follows an arcuate path having a relatively short radius as controlled by the shorter length 18. An intermediate portion of the lever 16, represented by the pivot point 33, follows an arcuate path having a relatively long radius as controlled by the longer length 19. As the roller frame oscillates either upwardly or downwardly, both of the pivot points 26 and 33 tend to move closer to the longitudinal centerline of the vehicle. However, because of the different lengths of the links 18 and 19 and the different arcuate paths for the pivot points 26 and 33 as described above, the pivot point 23 which attaches the lower end of the lever 16 to the roller frame tends to move outwardly relative to both of the pivot points 26 and 33 by an increasing amount depending upon the distance by which the forward end of the roller frame 12 is oscillated from its normal position indicated in FIG. 1. From a comparison of the solid line and broken line position of the pivot point indicated at 23 and 23' respectively, it is apparent that the forward end of the roller frame 12 tends to move in a plane generally parallel to a vertical plane through the centerline of the main frame. In this manner, the compensating linkage of the present invention tends to minimize or eliminate misalignment between the roller frame and the main frame, thus, minimizing stress and increasing the operating life of the drive components for the tractor. It is also apparent that the compensating linkage on the right-hand side of the main frame as viewed in FIG. 3, similarly serves to prevent misalignment between the roller frame 13 and the main frame 11. The solid line and broken line positions of the roller frame 13 are reversed with comparison to roller frame 12 to indicate the normal manner of oscillation of the roller frames.

Referring also to FIG. 2, it is apparent that the pivot points 23 and 33 tend to move rearwardly relative to the fixed pivot point 26 as the forward end of the roller frame 12 oscillates either upwardly or downwardly. The ball or spherical-type joints which form the pivot points 23, 33 and 26 accommodate this longitudinal misalignment and minimize stress in the compensating linkage.

In the embodiment of the present invention as shown in FIG. 1, for example, the weight of the forward end of the main or chassis 11 is supported on the roller frames 12 and 13 by means of an equalizing support bar 41 centrally secured to the main frame 11 by a connection 42 which permits relative oscillation between the support bar 41 and the main frame 11. The connection 42 includes a V-shaped seat or plate 43 which is secured to the bar 41 which is supported by a plate 44 which is a structural portion of the main frame 11. A rubber pad 46 is compressed between the plate 43 and a boxlike structure 47 which is secured to the plate 44. The support bar 41 is thus secured to the main frame 11 while being free to oscillate with respect to the main frame against the resistance of the rubber pad. The ends 48 and 49 of the support bar 41 are disposed in slidable relation above pads 51 and 52 formed on the roller frames 12 and 13 respectively. As is made apparent in FIG. 3, this arrangement permits the support bar 41 to move laterally relative to the roller frames 12 and 13 during oscillation of the roller frames while continuing to support the weight of the main frame 11 upon both of the roller frames.

Use of equalizing support means such as the bar 41 in conjunction with the present compensating linkage serves to substantially remove the weight of the main frame 11 from the compensating linkage so that the compensating linkage is employed only to distribute and transfer side loads experienced by the roller frame.

The present invention also contemplates the use of diagonal side brace members 53 and 54 which are pivoted at 56 and 57 respectively to the housing 14 and extend forwardly and outwardly for connection to the roller frames 12 and 13 respectively. The diagonal side brace members 53 and 54 assist in preventing or reducing misalignment of the roller frames 12 and 13 as they oscillate relative to the main frame 11. The side brace members 53 and 54 are of generally conventional construction. However, when used in combination with the compensating linkage of the present invention, side loads experienced by the roller frames 12 and 13 are transferred through both the diagonal brace members and the compensating linkage, thus, permitting the size and weight of their components to be substantially reduced.

Another embodiment of the present invention is illustrated in FIG. 4. In that embodiment, equalizing support means for the main frame 11, similar to the support bar 41 of FIG. 1, is combined within compensating linkage which is generally similar in other respects to the compensating linkage shown in FIG. 1. In this embodiment, the main frame 61 and roller frames 62, 63 are similar to the components indicated at 11, 12 and 13 respectively in FIG. 1. Levers 64 and 66 pivoted at 67 and 68 to the roller frames 62 and 63 respectively are similar to the levers 16 and 17 of FIG. 1. A relatively short link 69 is pivoted at 71 to an upper end of each lever 64, 66 and to an adjacent side portion of the main frame 61 as at 72. A structural member 73 is pivoted at 74 to the center of the main frame 61 along a longitudinal axis of the vehicle with its ends being pivotally connected to intermediate portions of the respective levers 64 and 66 as indicated at 76. In this embodiment, the single member 73 serves as the longer link for each of the levers 64 and 66. The compensating linkage illustrated in FIG. 4 functions in a generally similar manner as that illustrated in FIG. 1 and described above. However, it is apparent that the single member 73 replaces both of the longer links associated with the levers 16 and 17 in FIG. 1 as well as the support bar indicated at 41 in FIG. 1.

I claim:

1. Compensating linkage in a track-type tractor having main frame and track roller frames pivoted adjacent their rearward ends to the main frame, comprising a lever associated with each roller frame, each lever being connected in compensating relation to a forward portion of the main frame by two links of unequal lengths, the two compensating levers being effective to provide for generally constant lateral alignment of the roller frames during relative oscillation between the roller frames and main frame, an end portion of each lever being pivoted to one of the roller frames, a shorter link being pivoted between the main frame and an opposite end portion of each lever, a longer link being pivoted between the main frame and an intermediate portion of each lever, the levers being pivoted to the respective roller frames and links by spherical joints, an equalizer support bar supporting a forward portion of the main frame, the bar extending laterally above a portion of each roller frame to support the forward portion of the main frame on the roller frames.

2. The invention of claim 1 wherein the equalizer bar is free to oscillate about a longitudinal axis of the main frame, the roller frames slidably supporting respective ends of the equalizer bar.

3. Compensating linkage in a track-type tractor having a main frame and track roller frames pivoted adjacent their rearward ends to the main frame, comprising a lever associated with each roller frame, each lever being connected in compensating relation to a forward portion of the main frame by two links of unequal lengths, the two compensating levers being effective to provide for generally constant lateral alignment of the roller frames during relative oscillation between the roller frames and main frame, an end portion of each lever being pivoted to one of the roller frames, a shorter link being pivoted between the main frame and an opposite end portion of each lever, a longer link being pivoted between the main frame and an intermediate portion of each lever, the levers being pivoted to the respective roller frames and links by spherical joints, a pair of the links associated respectively with the two levers, being formed by a single member which is pivoted at the center of the main frame along a longitudinal axis thereof.

4. The invention of claim 3 wherein the single member is effective to support the weight of the main frame on the roller frames.

5. The invention of claim 4 wherein each lever is pivoted at one end to one roller frame, a relatively shorter link being pivoted between the main frame and an opposite end of each lever, the single member being pivoted at its ends to intermediate portions of the two levers.

6. In a track-type tractor, the combination comprising, a main frame, track roller frames arranged on the sides of the main frame, drive means providing a pivotal connection between the main frame and the roller frames adjacent one end thereof, and compensating linkage interconnected between the main frame and roller frames, the linkage including a lever pivotally connected to each roller frame and a pair of links pivotally connecting each lever with the main frame, the lengths of the links and the arrangement of the levers and links between the main frame and roller frames being selected to maintain generally constant lateral alignment of the roller frames relative to the main frame, the levers being pivoted at one end to the respective roller frames, a shorter link pivotally interconnecting the opposite end of each lever with an adjacent side portion of the main frame, a longer link pivotally interconnecting an intermediate portion of each lever with a portion of the main frame generally adjacent its longitudinal centerline, the levers being pivoted to the respective roller frames and links by spherical joints, bracing members being interconnected between the main frame and the respective roller frames adjacent the drive means, an equalizer bar pivotally supporting the main frame at a point toward its opposite end from the drive means and extending above a portion of each roller frame, the compensating linkage being interconnected between the main frame and roller frames generally adjacent the equalizer bar.